United States Patent [19]
Okabayashi et al.

[11] 3,977,655
[45] Aug. 31, 1976

[54] LIQUID AGITATOR WITH VIBRATION SUPPRESSING STABILIZERS

[75] Inventors: Takashi Okabayashi; Satoru Mikuni, both of Kobe, Japan

[73] Assignee: Sybron Corporation, Rochester, N.Y.

[22] Filed: Apr. 10, 1974

[21] Appl. No.: 459,705

[30] Foreign Application Priority Data
Apr. 21, 1973  Japan.............................. 48-45446

[52] U.S. Cl.................................. 259/107; 259/7; 259/23; 259/43
[51] Int. Cl.²............................................ B01F 7/18
[58] Field of Search................... 259/107, 108, 7, 8, 259/23, 43, 44

[56] References Cited
UNITED STATES PATENTS

| | | | |
|---|---|---|---|
| 776,383 | 11/1904 | Bryan................................. | 259/107 |
| 2,884,234 | 4/1959 | Gebhart et al........................ | 259/7 |
| 2,964,301 | 12/1960 | Bosse................................. | 259/107 |
| 3,012,977 | 12/1961 | Wilson et al......................... | 259/107 |
| 3,110,481 | 11/1963 | Kivenson............................. | 259/107 |
| 3,194,638 | 7/1965 | Neuville.............................. | 259/44 |
| 3,249,342 | 5/1966 | Mikkelsen............................ | 259/107 |

*Primary Examiner*—Richard E. Aegerter
*Assistant Examiner*—L. Footland
*Attorney, Agent, or Firm*—Theodore B. Roessel; James A. Rich

[57] ABSTRACT

A liquid agitator having agitator blades attached to a rotary shaft centrally located within a liquid containing vessel is provided with a vibration suppressing stabilizer, consisting of one or more plates attached to the agitator shaft. The span of the stabilizer is somewhat less than the diameter of the agitator blades, but equal to at least about 20% of the blade diameter. The height of the stabilizer is also equal to at least about 20% of the blade diameter. The stabilizer is located in a portion of the liquid within the vessel which rotates about the agitator shaft with a tangential velocity proportional to the distance from the shaft. Interaction between this liquid and the stabilizer suppresses agitator vibrations.

5 Claims, 9 Drawing Figures

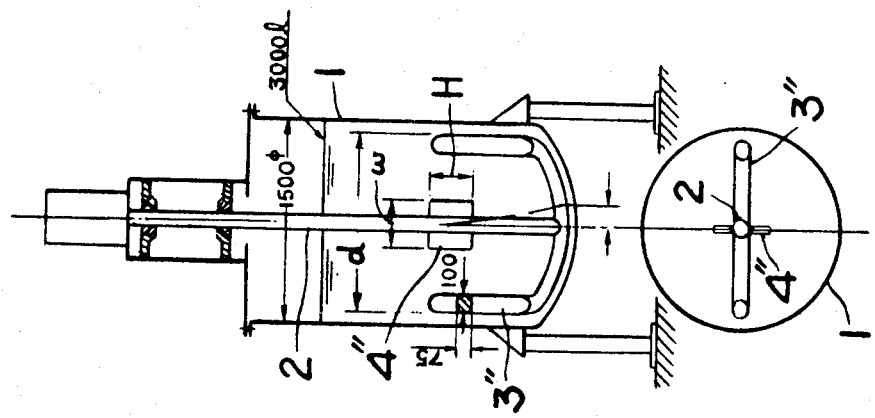
FIG.7
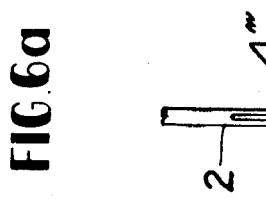
FIG.6a
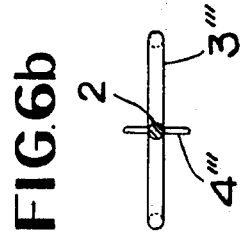
FIG.6b
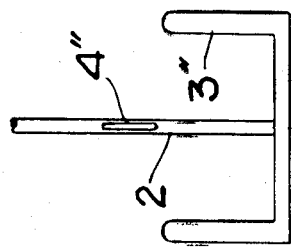
FIG.5a
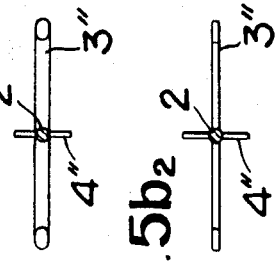
FIG.5b₁  FIG.5b₂
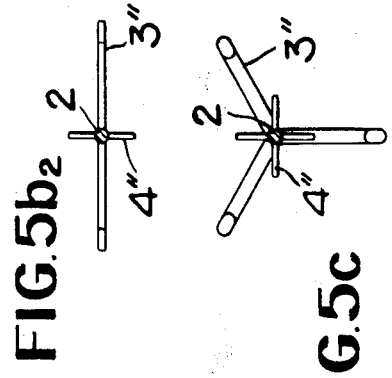
FIG.5c
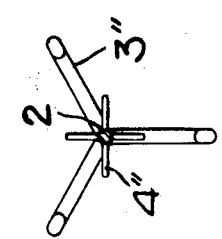

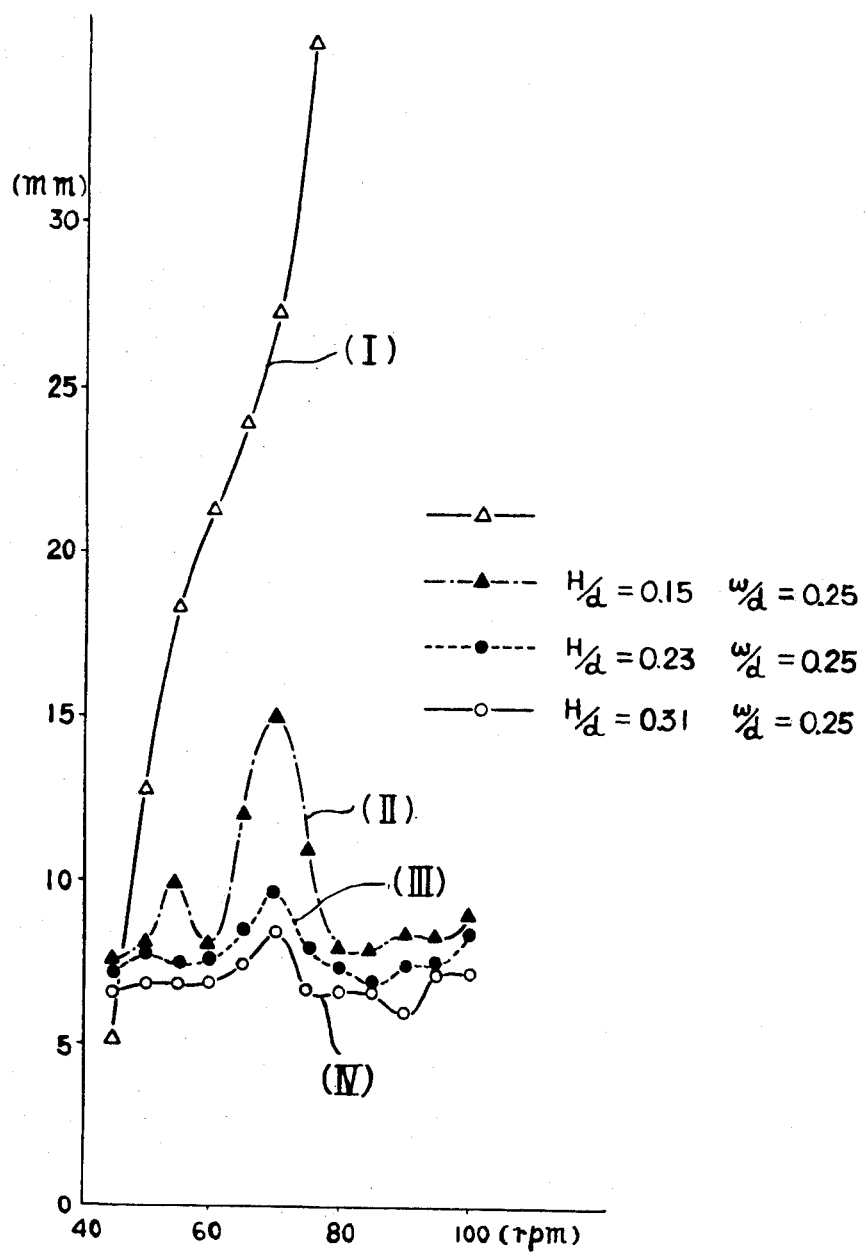

LIQUID AGITATOR WITH VIBRATION SUPPRESSING STABILIZERS

BACKGROUND OF THE INVENTION

This invention relates to liquid agitators and more particularly to means for suppressing vibrations in these agitators.

It is common practice in the chemical, food and beverage processing industries, among others, to mix materials in polymerizers, reactors, mixers and the like with agitators having blades extending from a rotary shaft located in the central portion of the vessel. One problem with these agitators is that relative motion between the liquid being agitated and the blades induces vibrations in the agitator. These vibrations can damage the glass linings frequently used on the agitators and/or the shaft seals and bearings that support the agitator. Furthermore, the vibrations may be transmitted to the vessel and to piping systems connected thereto, causing damage to these elements as well as to the agitator itself.

One conventional method of suppressing these vibrations is to mount the tip end of the agitator shaft in a bearing located at the bottom of the vessel, as described in Japanese Utility Model 10742/1960 and schematically illustrated in FIG. 1. However, complicated bearing structures are required in order to prevent entry of liquids inside the vessel which might corrode or abrade the bearing. Furthermore, discharge openings are frequently located in the bottom of the vessel at the same spot where it would be most desirable to mount such a bearing.

Attempts have also been made to suppress these vibrations by mounting a cylindrical stabilizer, as illustrated in FIG. 2, at the free tip end of the agitator shaft. However, stabilizers of this sort have not proved satisfactory.

SUMMARY OF THE INVENTION

It is an object of this invention to provide means for suppressing vibrations in liquid agitators which rotate about a centrally located shaft.

A further object of this invention is to provide means for suppressing agitator vibrations without increasing the power required for agitation.

According to the invention, a stabilizer, made up of one or more plates attached to the agitator shaft, is located within a portion of the liquid that rotates about the shaft with a tangential velocity proportional to the distance from the shaft. The span of the stabilizer is less than the agitator blade diameter, but equal to at least about 20% of the blade diameter. The height of the stabilizer is also equal to at least about 20% of the blade diameter. Interaction between the stabilizer plates and the liquid rotating about the shaft suppresses agitator vibrations. As will be seen below, in many cases this can be accomplished with little or no increase in the amount of power required for agitation.

DRAWINGS

As was indicated above,

FIG. 3b is a plan view of the agitator shaft and stabilizer plates shown in FIG. 3a.

Figure 4A:
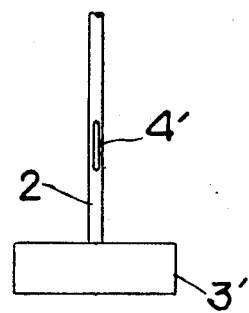
Figure 4B:
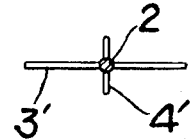

FIGS. 4, 5 and 6 contain elevation and plan views of various other agitators embodying this invention.

FIG. 7 contains diagrammatic elevation and plan views of a vessel in which experiments set forth below were conducted.

FIG. 8 is a graph of the results of these experiments.

DETAILED DESCRIPTION

Figure 1:
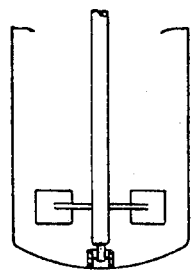
FIGS. 1 and 2 illustrate means that have been utilized in the prior art for vibration suppression.
Figure 2:
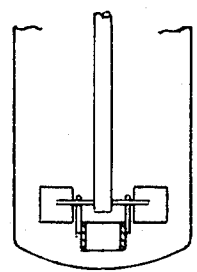
Figure 3A:
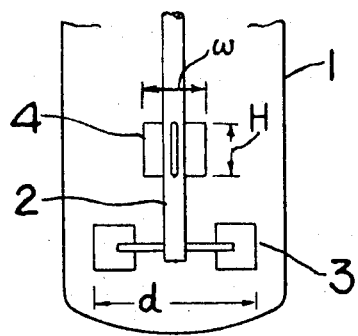
FIG. 3a is a diagrammatic elevation view of one embodiment of this invention.
Figure 3B:
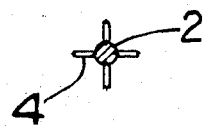

FIG. 3 illustrates a typical embodiment of this invention. An agitator shaft 2 is located at the central vertical axis of a liquid containing vessel 1. The shaft is supported and driven by bearings and a motor (neither of which are shown), located at the top of the vessel. Agitator blades 3 extend from the lower or free end of the agitator shaft.

A considerable amount of research on flow patterns in vessels such as this has been performed by Professors Nagata and Yamamoto of Kyoto University, Japan, and by various other researchers. Some of this work is summarized by Joseph B. Gray in Chapter 4 of MIXING: Theory and Practice, Vincent W. Uhl and Joseph B. Gray, Eds., Vol. 1, Academic Press, New York and London (1966). As may be seen from this review, under many conditions a portion of the liquid in the vessel rotates about the agitator shaft 2 much like a solid cylinder. All of the liquid in this region rotates at substantially the same angular velocity or, in other words, the tangential velocity of the liquid in this central region is proportional to the distance from the agitator shaft. Under many conditions, particularly when baffling in the vessel is relatively mild, this liquid rotates at substantially the same angular velocity as the agitator.

A stabilizer 4, consisting in this case of four plane plates attached to the agitator shaft 2, is located in this "solid" cylindrical rotating portion of the liquid. The span $w$ of the stabilizers 4 should be somewhat less than the agitator blade diameter $d$. Both the span $w$ and the height H of the stabilizer 4 should be equal to at least about 20% of the blade diameter $d$.

As may be seen from the experimental results set forth below, the interaction of the rotating liquid and the stabilizer 4 effectively suppresses agitator vibrations. Furthermore, when the "solid" cylindrical portion of the liquid is rotating at substantially the same angular velocity as the agitator, the stabilizer 4 does not function as an agitator. Thus, under these conditions, incorporation of the stabilizer results in little or no increase in the amount of power required to drive the agitator.

As a general rule, it is believed that the optimum span to agitator diameter and height to agitator diameter ratios ($w/d$ and $H/d$) will usually be about 0.25. However, the optimums may vary somewhat from installation to installation, depending upon such factors as the size and rigidity of the agitator shaft; the type, size and location of the agitator blades; the speed at which the agitator rotates; the type, size and number of baffles, dip pipes and other fixtures within the vessel; and the viscosity of the liquid being agitated. The best size for any given condition may readily be determined from the published literature on velocity profiles within agitated vessels, such as the text referred to above and Professor Nagata and Professor Yamamoto's reports, or by simple experiments.

The optimum location for the stabilizer on the agitator shaft may also vary somewhat depending upon the foregoing factors. Generally it is preferrable to locate the stabilizer fairly near the free end of the agitator since this is where the amplitude of the vibrations is usually the greatest. Furthermore, locating the stabilizer near the free end of the agitator results in the maximum moment arm between the stabilizer and the bearings that support the agitator. Thus, all else being equal, the stabilizer will generally be most effective when it is relatively near the free end of the agitator. However, when the free end is close to the bottom of the vessel, as shown in the Figures herein, it will frequently be preferrable to position the stabilizer somewhat closer to the center of the vessel to insure that the stabilizer is within the "solid" cylinder of rotating liquid.

The stabilizer 4 illustrated in FIG. 3, in which plates extend radially in all directions from the shaft, provides vibration control with respect to vibrations of the shaft in any direction. In some cases, however, this is not necessary. In the embodiment shown in FIG. 4, which has a paddle type agitator blade 3' having hydraulically directional features, most of the vibrations are produced in the direction of the blade face. In this agitator, effective vibration control is obtained by means of a stabilizer 4' comprising two plane plates extending from the shaft 2 at right angles to the agitator blade 3'.

Experiments have also shown that stabilizers according to this invention are effective in suppressing vibrations in anchor-shaped agitator blades 3'' such as those illustrated in FIGS. 5 and 7, wherein the outer circumferential portions of the blades are cylindrical (FIG. 7), oblong [FIG. 5 $b(1)$] or rectangular [(FIG. 5 $b(2)$]]; and in agitators like the one illustrated in FIG. 6, wherein the agitator blade 3''' comprises a closed loop at the bottom of the agitator shaft 2, and the stabilizer 4''' comprises a pair of plane plates extending from the shaft at right angles to the agitator blade.

FIG. 7 illustrates a vessel 1 and agitator utilized for certain experiments that demonstrate some of the advantages to be derived from this invention. The vessel had a diameter of 1.5 meters and contained 3,000 liters of liquid. An anchor-shaped agitator having two stirring blades 3'' was supported by bearings located at the top of the vessel and driven by a variable speed drive also atop the vessel. The agitator shaft had a diameter of 73 millimeters, and the distance from the bottom bearing to the tip of the agitator shaft was approximately 2.7 meters. The outer circumferential portions or tips of the agitator blades 3'' were 100 millimeters in diameter, and the overall diameter (d) of the blades was 1.3 meters.

Tests were conducted without a stabilizer and with stabilizers 4'' of different sizes. Each stabilizer consisted of a pair of plane plates extending from the agitator shaft 2 at right angles to the agitator blades 3''. (In the elevation view the stabilizer plates are rotated 90° for purposes of illustration).

The agitator was rotated at different speeds and the amplitude of the vibrations produced at each speed was measured just below the top of the main portion of the vessel 1. As may be seen from FIG. 8, which is a graph of the amplitude of the resulting vibrations in millimeters versus agitator speed in rpm, when no stabilizer was used (Curve I) the vibrations increased rapidly as the agitator speed increased. With a stabilizer that provided a span ($w$) to agitator blade diameter ($d$) ratio of 0.25 and a stabilizer height to agitator diameter ratio (H/$d$) of 0.15 (Curve II) vibrations were suppressed somewhat, but still increased by an undesirable amount at certain speeds. However, with larger stabilizers which brought the $w/d$ and H/$d$ ratios within the ranges defined by the following claims (Curves III and IV) the vibrations remained relatively constant and at a low level over the entire range of speeds tested.

Thus, it may be seen that stabilizers according to this invention effectively suppress agitator vibrations. Of course, it should be understood that the embodiments described above are merely illustrative and that those skilled in the art may make many modifications within the scope of this invention, which is defined by the following claims.

We claim:

1. In apparatus for agitating a liquid comprising:
    a vessel;
    a rotary agitator comprising:
        a centrally located rotary shaft having a first end and a second end, said first end being supported by said vessel, and
        agitator blades attached to said second end; and
    means for rotating said agitator about said shaft so that at least a portion of the liquid rotates about the shaft with a tangential velocity proportional to the distance from the shaft;
    the improvement comprising a vibration suppressing stabilizer comprising a plurality of plates attached to said rotary shaft above and near to said agitator blades and located within said rotary portion of the liquid, said stabilizer having a span less than the agitator blade diameter but equal to between 20 to 25% of the blade diameter and a height of at least about 20% of the blade diameter.

2. A vessel according to claim 1 wherein the span of the stabilizer is about 25% of the blade diameter.

3. A vessel according to claim 1 wherein the height of the stabilizer is equal to about 25% of the blade diameter.

4. A vessel according to claim 1 wherein the span of the stabilizer and the height of the stabilizer are both equal to about 25% of the blade diameter.

5. A vessel according to claim 1 wherein the stabilizer plates extend from said shaft at right angles to said agitator blades.

* * * * *